United States Patent
Hashimoto

(10) Patent No.: US 6,704,054 B1
(45) Date of Patent: Mar. 9, 2004

(54) AUTOFOCUSING SYSTEM

(75) Inventor: Hitoshi Hashimoto, Sagamihara (JP)

(73) Assignee: Olympus Corporation (JP)

( * ) Notice: Subject to any disclaimer, the term of this patent is extended or adjusted under 35 U.S.C. 154(b) by 0 days.

(21) Appl. No.: 09/421,678

(22) Filed: Oct. 20, 1999

(30) Foreign Application Priority Data

Oct. 23, 1998 (JP) ........................................ H10-302915

(51) Int. Cl.[7] .............................................. H04N 5/232
(52) U.S. Cl. ....................................... 348/354; 348/348
(58) Field of Search ................................ 348/354, 345, 348/349, 353, 361, 362, 348

(56) References Cited

U.S. PATENT DOCUMENTS

| | | | | |
|---|---|---|---|---|
| 4,592,638 A | * | 6/1986 | Kaneda et al. | 348/348 |
| 4,614,974 A | * | 9/1986 | Toyama | 348/348 |
| 4,621,292 A | * | 11/1986 | Hirao et al. | 348/348 |
| 4,695,893 A | * | 9/1987 | Makino et al. | 348/348 |
| 5,157,435 A | * | 10/1992 | Min et al. | 348/348 |
| 5,896,174 A | * | 4/1999 | Nakata | 348/348 |
| 6,271,883 B1 | * | 8/2001 | Iijima et al. | 348/345 |
| 6,512,549 B1 | * | 1/2003 | Iijima et al. | 348/349 |

FOREIGN PATENT DOCUMENTS

JP    5-119250    5/1993

* cited by examiner

Primary Examiner—Wendy R. Garber
Assistant Examiner—Luong Nguyen

(74) Attorney, Agent, or Firm—Ostrolenk, Faber, Gerb & Soffen, LLP

(57) ABSTRACT

An autofocusing system is comprised of an image pickup device which performs a photoelectric conversion of an image of a subject, formed through an imaging optical system, to produce an electric image signal. An image pickup unit, including the imaging optical system, produces the subject image. A driving device drives the image pickup unit through one of a first range and a second range the second range being smaller than the first range. A high-frequency component detecting device detects a high-frequency component in an image signal obtained while at least a portion of the image pickup device is shifted by a predetermined quantity through the use of the driving device. A focusing drive device adjusts a focal condition of an image by an image signal on the basis of an output of the high-frequency component detecting device. An infrared light detecting device includes a light-emitting device for radiating infrared light toward the subject and a light-receiving device for receiving reflected light produced by a reflection of the infrared light from the subject. The infrared light detecting device includes an output signal corresponding to a subject distance on the basis of an output of the light-receiving device. A calculating device calculates a subject distance on the basis of an output of the infrared light detecting device. A control unit drives the image pickup unit in the first range when the subject distance calculated by said calculating device is shorter than a predetermined distance and drives the image pickup unit in the second range when the subject distance is longer than the predetermined distance.

4 Claims, 7 Drawing Sheets

AUTOFOCUSING SYSTEM

BACKGROUND OF THE INVENTION

1. Field of the Invention

The present invention relates to an autofocusing system, and more particularly to an autofocusing system for use in, for example, an electronic image pickup apparatus which obtains an electrical image signal through the use of an image pickup device which performs; a photoelectric conversion of an image of a subject formed through an imaging optical system.

2. Description of the Related Art

In recent years, electronic image pickup apparatus have come into widespread use. An example of an electronic image apparatus is an electronic still camera which performs; a photoelectric conversion of an image of a subject. The image is received through an imaging optical system and transformed into an electric signal through the use of an image pickup device. The apparatus further records an image signal thus obtained on a recording medium.

Such electronic image pickup apparatus, include a means to detect a focal position (the position of a focal point), and is equipped with an autofocusing system (which will hereinafter be referred to simply as an AF means). The autofocusing system automatically accomplishes the focal adjustment on the basis of a focal position obtained by the focal position detecting means.

Among conventional autofcusing systems applicable to electronic image pickup apparatus, for example, there have been known a so-called contrast detection AF means (which will be referred hereinafter to as an imager AF. In this technique, the detection of a focal position of a subject image is made on the basis of a difference (contrast) of high-frequency components contained in an image signal received through an image pickup device. The imager AF means technique further uses an infrared active type AF means (which will be referred to hereinafter as an infrared active AF means) which is a trigonometric survey technique where an illuminating light beam, such as a infrared ray, is applied to a subject. A reflected light beam, occurring due to the reflection of the illuminating light beam on the subject, is received and used for calculating the distance to the subject based on an angle made between the illuminating light beam and the reflected light beam.

This infrared active AF means performs open loop control in which a group of predetermined lenses (which will be referred to hereinafter as a focus lens group), of an imaging optical system, are shifted by a predetermined preset distance in accordance with a focal position detection result thereby focusing the device.

In an electronic image pickup apparatus (or the like) using the infrared active AF means, the time is short needed between the start of a focal position detecting operation (generation of a release instruction signal) until the actual completion of the autofocusing operation (AF operation). This an advantage is that the time is short between the generation of a release signal to the start of the actual exposure operation, the release time lag. Additionally, even if the environment is in a low luminance condition for photography, the focal position detection result is surely obtainable.

On the other hand, there is a limit to the distance that the illuminating light beam can reach. In the case of a subject existing remotely, there difficulty in attaining a precise focal position detection result. Further, when the focus lens group is shifted in accordance with a focal position detection result by the infrared active AF means, external factors become relevant. For example, if a lens barrel holding an image pickup optical system to cause a mechanical positional difference is used, difficulty can be experienced in shifting the focus lens group to an appropriate position.

The imager AF means also employ feedback control (the so-called mountain-climbing type AF means). In these devices a high-pass filter (HPF) is used to extract a high-frequency component from an image signal obtained by an image pickup device. The focus lens group of the imaging optical system is moved in a direction of its optical axis, and the extracted high-frequency component is compared in quantity with each high-frequency component corresponding to each focus lens position. The highest contrast point (point assuming a peak value) is thus detected and is indicative of the largest high-frequency component quantity.

Thus, in an electronic image pickup apparatus using the imager AF means, if the detection of the contrast in an image taken is possible, the focal position detection result is surely obtainable regardless of the distance from a subject. On the other hand, since the high-frequency component quantity is detected at each position while the focus lens group is shifted, the time needed for the focal position detecting operation becomes long. This causes a disadvantage in that the release time lag is prolonged. Additionally, for example, if the environment is in a low luminance condition at photography, or if a desired subject is in a low contrast condition, there is a possibility that the contrast of an image taken cannot be surely detected depending on the condition of the subject. Such a situation can prolong the time needed for the focal position detecting operation and can make it difficult to detect the focal position.

For this reason, a conventional electronic image pickup apparatus is equipped with an infrared active AF means and an imager AF means, and selectively used the two AF means to obtain an appropriate focal position detection result when needed such a device is shown in, for example, Japanese Unexamined Patent Publication 5-119250 and others.

The autofocusing system disclosed in Japanese Unexamined Patent Publication 5-119250 is designed such that the focusing operation is conducted by the imager AF means during ordinary imaging operation. Only in imaging environments where difficulty is encountered in detecting a focal position through the use of this imager AF means, the device switches to the infrared active AF means to conduct the focal position detecting operation and the AF operation with respect to a desired subject. Thus, this can provide a proper focal position detection result regardless of the degree of brightness of the subject.

In the infrared active AF means, when a neighboring subject is photographed, the optical axis of the light emitting/receiving means, (the light beam path) does not coincide with the optical axis of the imaging optical system. This causes a small difference, or parallax, between the focal position detecting area in a picture determined by the AF means and the position of the desired subject in the picture taken. Generally this parallax increases as the distance between the electronic image pickup apparatus and the subject becomes shorter.

When photographing a subject where the distance to the subject is small (near photography or proximity photography), the depth of field decreases. As a consequence even if a focal position detecting operation is conducted for a focal position detecting position set at a position shifted from the subject position due to the occurrence of the parallax, the focal position detection result can contain errors. As a result, the subject may be out of focus in the picture.

Incidentally, the means disclosed in Japanese Unexamined Patent Publication 5-119250 and others are made such that the two AF means are selectively chosen based only on the brightness of a subject. These devices do not solve problems including the occurrence of the parallax in near photography at all. These devices do not disclose an approach to eliminate various problems arising due to the occurrence of the parallax.

The present invention was developed in consideration of the above-mentioned problems.

SUMMARY OF THE INVENTION

Accordingly, it is an object of the present invention to provide an autofocusing system, for use in an electronic image pickup apparatus, which is capable of surely conducting a focal position detecting operation at a high speed to obtain a highly accurate focal position detection result even in near photography.

Briefly, in accordance with an aspect of this invention, an autofocusing system is characterized by comprising an image pickup device for conducting a photoelectric conversion of an image of a subject, formed through an imaging optical system, to produce an electric image signal, image pickup means including the imaging optical system for picking up the subject image, driving means for driving the image pickup means in a first preset range or in a second range smaller than the first range, high-frequency component detecting means for detecting a high-frequency component in an image signal corresponding to a subject image formed while at least a portion of the image pickup means is shifted by a predetermined quantity through the use of the driving means, focusing drive means for adjusting a focal condition of an image, produced by the image pickup means, on the basis of an output of the high-frequency component detecting means, infrared light detecting means including light-emitting means for radiating infrared light toward the subject and light-receiving means for receiving reflected light produced by reflection of the infrared light from the light-emitting means on the subject and made to detect an output signal corresponding to a distance to the subject on the basis of an output of the light-receiving means, calculating means for calculating a distance to the subject on the basis of an output of the infrared light detecting means, and control means for driving the image pickup means in said first range when the distance to the subject calculated by the calculating means is shorter than a predetermined distance and for driving the image pickup means in the second range when the distance to the subject calculated by the calculating means is longer than the predetermined distance.

This object, and another objects and advantages, of the present invention will become more readily apparent from the following detailed description.

According to this invention, in an electronic image pickup apparatus equipped with an imager AF means and an infrared active AF means, there is offered an autofocusing system capable of surely conducting a focal position detecting operation at a high speed even in a near photography irrespective of a distance to a subject to obtain a high-accuracy focal position detection result at all times.

DESCRIPTION OF THE PREFERRED EMBODIMENTS

Figure 1:
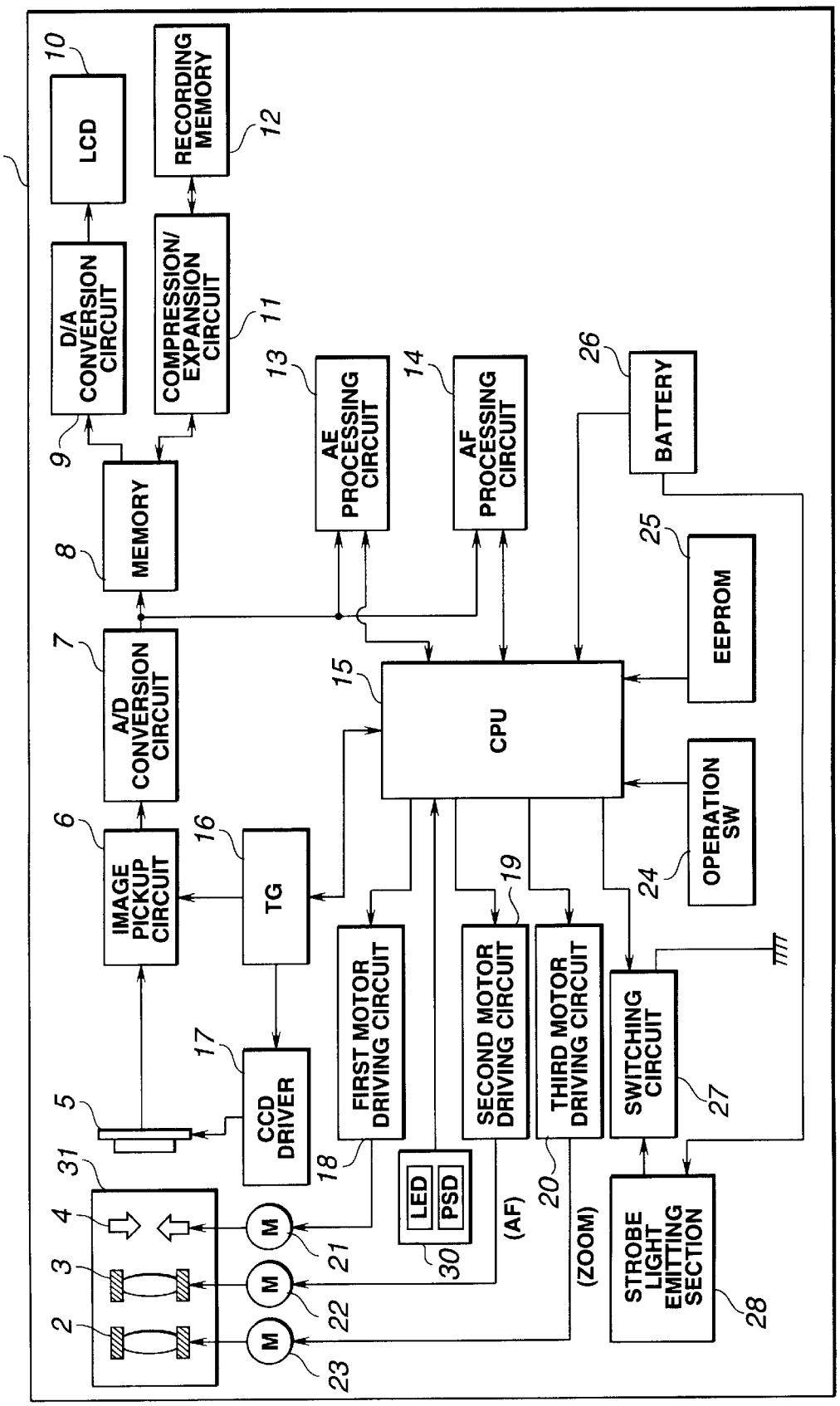
FIG. 1 is a block diagram showing a configuration of an electronic image pickup apparatus equipped with an autofocusing system according to an embodiment of the present invention.

Referring to FIG. 1, an electronic image pickup apparatus, designated generally at 1 is comprised of an imaging lens barrel 31 of an imaging optical system. The imaging optical system includes a zoom lens group 2, a focus lens group 3 and a diaphragm section 4 serving as an exposure means, or a light quantity adjusting means for adjusting a quantity of a light beam passing through the imaging optical system. A solid-state image pickup device, such as a CCD, (which will be referred to hereinafter as a CCD) 5 forms a subject image from the light beam passing through the imaging optical system and further performs the photoelectric conversion of the subject image. An image pickup circuit 6 receives an electric signal produced by the photoelectric conversion by the CCD 5 and produces a predetermined image signal through various image processing techniques. An A/D conversion circuit 7 converts the image signal (analog signal) produced by the image pickup circuit 6 into a digital signal. A memory 8, such as a buffer memory, serves as a temporarily storing means for receiving an output of the A/D conversion circuit 7 to store the image signal temporarily. A D/A conversion circuit 9 reads out the image signal temporarily stored in the memory 8, converts the image signal into an analog signal, and into an image signal suitable for a reproduction output. An image display unit 10, such as a liquid crystal display (LCD), (which will be referred to hereinafter as an LCD) displays the image signal in the form of a picture. A recording memory 12 used as a recording medium for the recording of image data is constructed using a semiconductor memory or the like. A compression/expansion circuit 11 is comprised of a compression circuit for reading out the image signal temporarily stored in the memory 8 and the performing compression processing or encoding of image data to convert it into a state suitable for the recording in the recording memory 12. Compression/expansion circuit 11 further includes an expansion processing circuit for conducting decoding, expansion processing, or the like, to convert the image data recorded in the recording memory 12 into a state most suitable for reproduction, display or the like. A control means 15, such as a CPU, (which will be referred to hereinafter as a CPU) controls the electronic image pickup apparatus wholly. An AE processing circuit 13 performs an automatic exposure (AE) processing upon receipt of an output of the A/D conversion circuit 7. An AF processing circuit 14 performs an autofocusing processing (AF processing) upon receipt of the output of the A/D conversion circuit 7. A timing generator (which will be referred to hereinafter as a TG) 16 generates a predetermined timing signal. A CCD driver 17 controls the drive of the CCD 5. A diaphragm driving motor 21 serves as a first motor for driving the diaphragm section 4. A first motor driving circuit 18 controls the drive of the diaphragm driving motor 21. A focus motor 22 serves as a second motor for driving the focus lens group 3. A second motor driving circuit 19 controls the drive of the focus motor 22. A zoom motor 23 serves as a third motor for driving the zoom lens group 2. A third motor driving circuit 20 controls the drive of the zoom motor 23. A power source battery (which will hereinafter be referred to simply as a battery) 26 supplies power to the respective electric circuits of the electronic image pickup apparatus. An EEPROM 25 forms an electrically rewitable read-only memory connected electrically to the CPU 15 and stores, for example, programs for implementing various kinds of control functions, and stores data for conducting various kinds of operations. An operation SW 24 comprised of a group of operational switches connected electrically to the CPU 15 generates instruction signals for various kinds of operations and transmits the instruction signals to the CPU 15. A strobe light emitting section 28 radiates a flash forming auxiliary light toward a subject. A switching circuit 27 controls the flash emission from the strobe light emitting section 28. An infrared active AF circuit 30, acting as an infrared light detector, comprised of a light-emitting diode (LED) or the like, serves as a light-source for radiating infrared light toward the subject and serves as an optical position detecting device (PSD; Position Sensitive Device) acting as a light-receiving circuit for receiving reflected light occurring due to the reflection of the radiated light from the LED by the subject, and detects an output of the PSD, namely, an output signal corresponding to a distance to the subject (which will be referred to hereinafter as a subject distance).

Recording memory 12, forming a recording medium for image data or the like, can be made in many forms. For example, a fixed type semiconductor memory can be constructed of a flash memory or the like, fixedly mounted on an electric circuit in the interior of this electronic image pickup apparatus 1; a semiconductor memory such as a flash memory having a card-like configuration or a stick-like configuration can be detachably set in the electronic image pickup apparatus 1; and a magnetic recording medium such as a hard disk or a floppy disk could be used. In this embodiment, a semiconductor memory is employed as the recording medium 12.

In addition, the operation SW 24 accepts, for example, a main power source switch for generating an instruction signal to start up electronic image pickup apparatus 1 and to function as a power supply. Operation SW 24 may also include release switch for generating an instruction signal to start an imaging operation (recording operation) or the like; a reproduction switch for generating an instruction signal to start a reproduction operation; and a zoom switch (zoom-up SW and zoom-down SW) for issuing an instruction signal to remove the zoom lens group 2 of the imaging optical system for starting a magnification varying operation.

The release SW is of a common type constructed of two switches. A first-stage switch (which will be referred to hereinafter as a 1st. release SW) generates an instruction signal to start an AE operation and an AF operation to be conducted prior to an imaging operation. A second-stage switch (which will be referred to hereinafter as a 2nd. release SW) receives a signal from the 1st. release SW to issue an instruction signal to start an exposure operation.

In the following description, the imaging lens barrel 31 including the imaging optical system (zoom lens group 2, the focus lens group and others), the diaphragm section 4 and others and the entire imaging system unit including the CCD 5 and others which perform the imaging operation will be referred to as an imaging circuit.

A description will be given hereinbelow of an operation of the electronic image pickup apparatus thus constructed according to this embodiment.

First of all, a beam of light from a subject (which will be referred to hereinafter as a subject beam), passes through the imaging optical system in the imaging lens barrel 31 of this electronic image pickup apparatus 1. The diaphragm section 4 adjusts the light quantity of the subject beam. The subject beam subsequently reaches a light-receiving surface of the CCD 5 to an image of the subject.

This subject image is converted into an electric signal through the photoelectric conversion processing by the CCD 5, and then outputted to the image pickup circuit 6. The image pickup circuit 6 conducts various kinds of image processing for the signal inputted from the CCD 5 as mentioned above, thereby producing a predetermined image signal. This predetermined image signal goes to the A/D conversion circuit 7 for conversion into a digital signal (image data). The digital signal is temporarily stored in the memory 8.

The image data stored in the memory 8 is outputted to the D/A conversion circuit 9 to be converted into an analog signal and further converted into an image signal most suitable for output and display, before being displayed (outputted) as an image on (to) the LCD 10. On the other hand, the image data stored in the memory 8 is further outputted to the compression/expansion circuit 11 to be compressed in the compression circuit of this compression/expansion circuit 11, and converted into image data most suitable for recording. The compressed and converted image data is then recorded in the recording memory 12.

Furthermore, for example, if the reproduction SW (not shown) of the operation SW 24 is operated to turn on, the reproduction operation starts. Accordingly, the image data recorded in the compressed state in the recording memory 12 is outputted to the compression/expansion circuit 11 to be decoded or expanded in the expansion circuit, and subsequently outputted to the memory 8 to be stored temporarily. Additionally, this image signal is outputted to the D/A conversion circuit 9 to be converted into an analog signal and converted into an image signal most suitable for output and display, before being outputted to the LCD 10 to be reproduced and displayed thereon.

In addition to the output to the memory 8, the image data digitized in the A/D conversion circuit 7 is also outputted to the AE processing circuit 13 and the AF processing circuit 14.

The AE processing circuit 13 receives the inputted digital image signal and conducts operations, such as accumulation, on the luminance of image data corresponding to one frame of the digital image signal. This produces an AE evaluation value corresponding to the brightness of the subject. This AE evaluation value is outputted to the CPU 15.

Meanwhile, the AF processing circuit 14 receives the inputted digital image signal and extracts a high-frequency component of image data corresponding to one frame or the like through a high-pass filter (HPF) or the like. The AF processing circuit 14 conducts operations, such as accumulation, on the extracted high-frequency component, thereby calculating an AF evaluation value equivalent to a high-frequency side contour component quantity or the like. This AF evaluation value is outputted to the CPU 15. Thus, the AF processing circuit 14 also serves as a high-frequency component detecting means for detecting a predetermined high-frequency component in the image signal produced by the CCD 5.

Furthermore, the TG 16 outputs a predetermined timing signal to the CPU 15, the image pickup circuit 6 and the CCD driver 17. The CPU 15 implements various kinds of control functions in synchronism with this timing signal from the TG 16. The image pickup circuit 6 conducts various kinds of image processing including color signal separation, in synchronism with the timing signal therefrom. The CCD driver 17 performs the drive control of the CCD 5 in synchronism with the timing signal therefrom.

The CPU 15 controls the first motor driving circuit 18, the second motor driving circuit 19 and the third motor driving circuit 20 to perform the drive control of the diaphragm section 4, the focus lens group 3 and the zoom lens group 2 through the diaphragm driving motor 21, the focus motor 22 and the zoom motor 23.

Concretely, the CPU controls the first motor driving circuit 18 on the basis of the AE evaluation value calculated in the AE processing circuit 13, to drive the diaphragm motor 21 to adjust the diaphragming quantity of the diaphragm section 4 to an appropriate value. The CPU further controls the drive of the CCD 5 through the TG 16 and the CCD driver 17 to control the charge storage quantity thereof, thereby accomplishing a predetermined AE control.

In addition, the CPU 15 controls the drive of the focus motor 22 through the second motor driving circuit 19 on the basis of the AF evaluation value calculated in the AF processing circuit 14, and the output of the infrared active AF means 30. Focus motor 22 controls the drive of the focus lens group 3 to move the focus lens group 3 to a given position for the in-focus state, thereby implementing the AF control. Thus, the focus motor 22 and the second motor driving circuit 19 act as a focusing drive circuit for conducting the focusing operation by shifting the focus lens group 3.

In response to the operation of the zoom SW (not shown) of the operation SW 24, the CPU 15 controls the drive of the zoom motor 23 through the third motor driving circuit 20 to move the zoom lens group 2 in a direction of its optical axis, thereby implementing the zoom control. Thus, the zoom motor 23 and the third motor driving circuit 20 serve as a zoom driving circuit for moving the zoom lens group 2 to conduct the magnification varying operation (zoom operation) of the imaging optical system.

Referring to the flow chart of FIG. 2, a description will be given of the operation of the electronic image pickup apparatus 1 when it performs imaging processing.

A sequence of this imaging processing is implemented when the main power supply SW of this electronic image pickup apparatus 1 is turned on and apparatus 1 is set at an imaging (recording) mode, namely, an imaging standby condition.

First of all, in a step S1, the CPU 15 confirms the state of the 1st. release SW. If it is confirmed that the user has actuated the release SW to turn on the 1st. release SW, the CPU 15 advances to the next step S2 to implement the ordinary AE processing. Subsequently, in a step S3, the CPU 15 controls the infrared active AF means 30 to cause the LED to emit light, and to make the PSD receive the reflected light thereof. The CPU receives an output of this PSD. The CPU 15 carries out the infrared active AF processing, that is, obtains a subject distance or the like through predetermined calculations based on of the output of the PSD. Accordingly, the CPU 15 acts as a calculating circuit for calculating a distance to a subject on the basis of an output of the infrared active AF means 30.

The infrared active AF processing conducted in this way is for roughly detecting the subject distance (the focal position of the focus lens group 3) to a desired subject, and so signifies a rough adjustment of the AF processing. In the following processing, the CPU 15 controls the imager AF means and others on the basis of a focal position detection result (calculation result) determined by the infrared active AF processing, thus performing fine adjustment AF processing to detect a focal position in a range corresponding to a subject distance.

In the next step S4, the CPU 15 makes a decision on whether or not the subject distance (calculation result) calculated through the infrared active AF processing in the aforesaid step S3 is equal to or more than a predetermined distance. The predetermined distance data to be compared with the calculation result is stored in advance in the EEPROM 25 or the like, and the CPU 15 reads out that data from the EEPROM 25.

If the decision of this step S4 shows that the subject distance calculated through the aforesaid infrared active AF processing is equal to or longer than the predetermined distance, the operational flow proceeds to a step S5 where imager AF processing is performed in a second range smaller than a predetermined first range. A detailed description of the imager AF processing in the second range to be conducted here will be given later with reference to FIGS. 3 and 4.

On the other hand, if the decision indicates that the subject distance calculated in the aforesaid step S3 is shorter than the predetermined distance, the operational flow proceeds to a step S6 where imager AF processing is performed in the predetermined first range. A detailed description of the imager AF processing to be conducted here will be given later with reference to FIG. 5.

After the completion of the aforesaid predetermined AF processing, the CPU 15 confirms an instruction signal from the 2nd. release SW in a step S7. If the instruction signal is confirmed the CPU 15 performs the actual exposure processing in the next step S8, thereafter terminating (end) the series of the imaging processing sequence.

Figure 2:
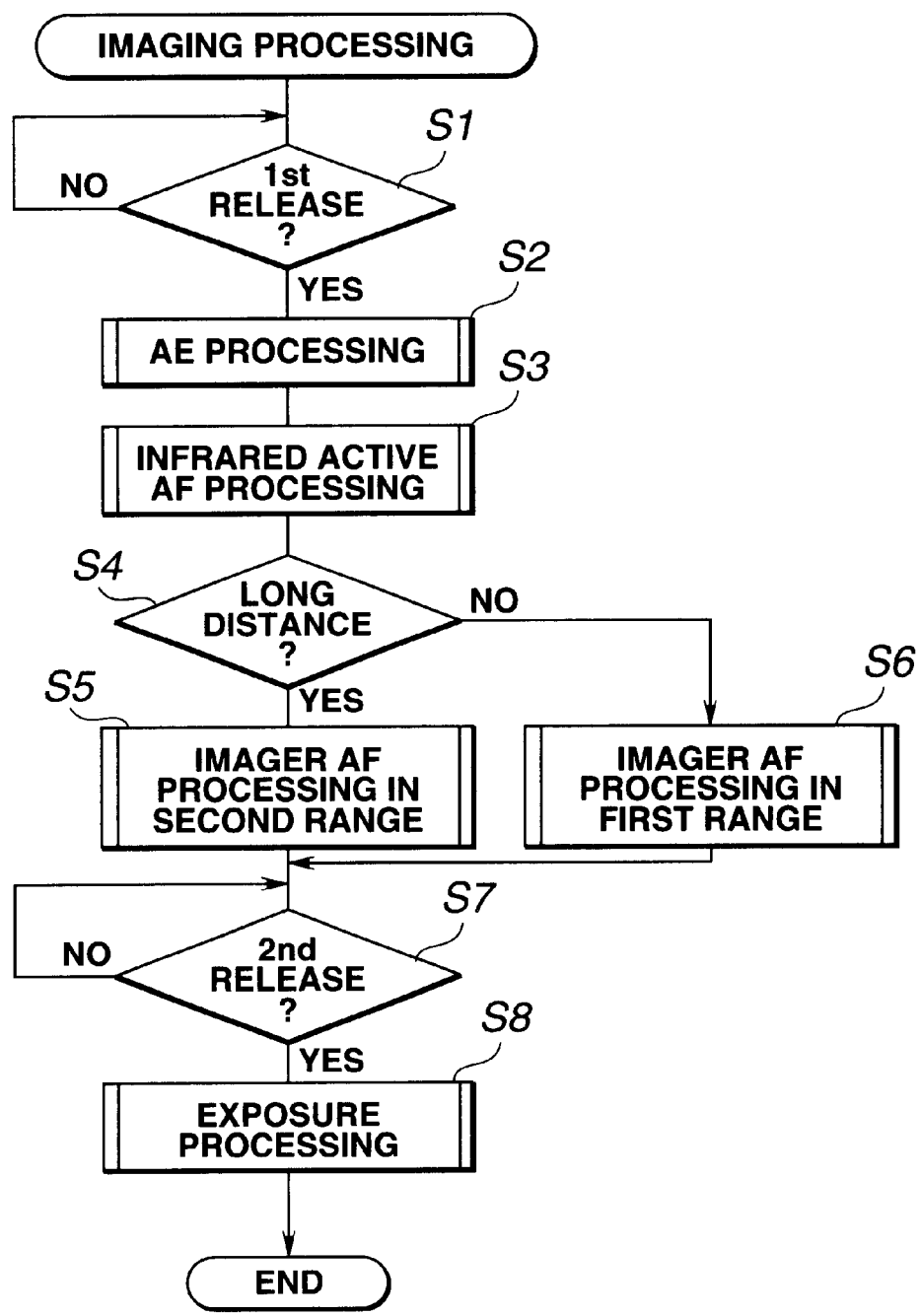
FIG. 2 is a flow chart showing an operation to be conducted for when the electronic image pickup apparatus shown in FIG. 1 performs imaging processing.
Figure 3:
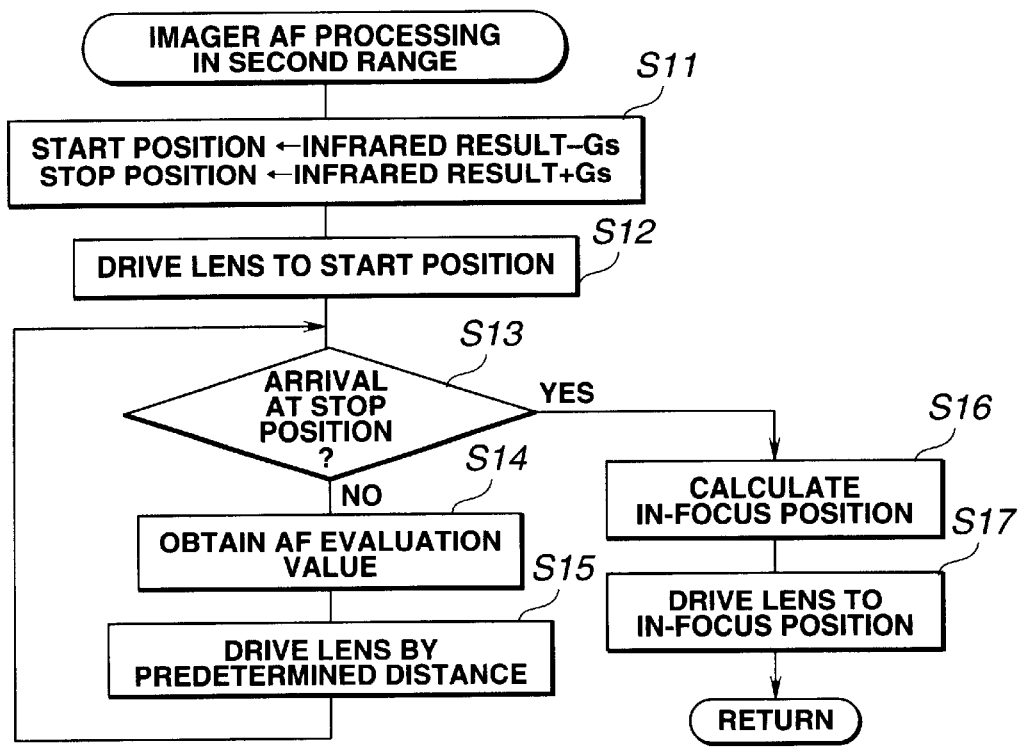
FIG. 3 is a flow chart showing a sequence of imager AF processing in a second range, of sequences of imaging processing to be conducted in the electronic image pickup apparatus shown in FIG. 1.
Figure 4:
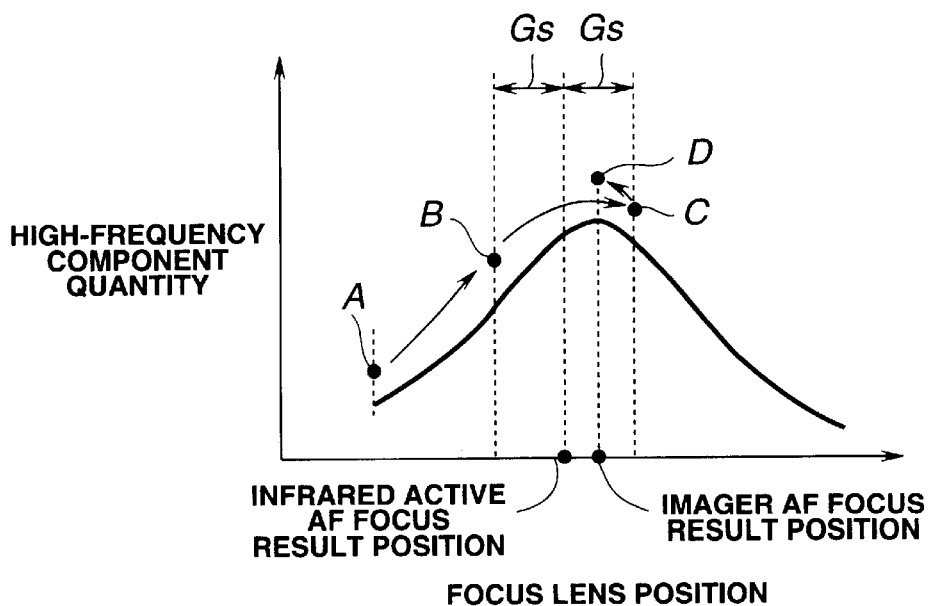
FIG. 4 is an illustration of the relationship between a high-frequency component quantity at the implementation of the imager AF processing in the second range, of the sequences of the imaging processing to be conducted in the electronic image pickup apparatus shown in FIG. 1, and a position of a focus lens.
Figure 5:
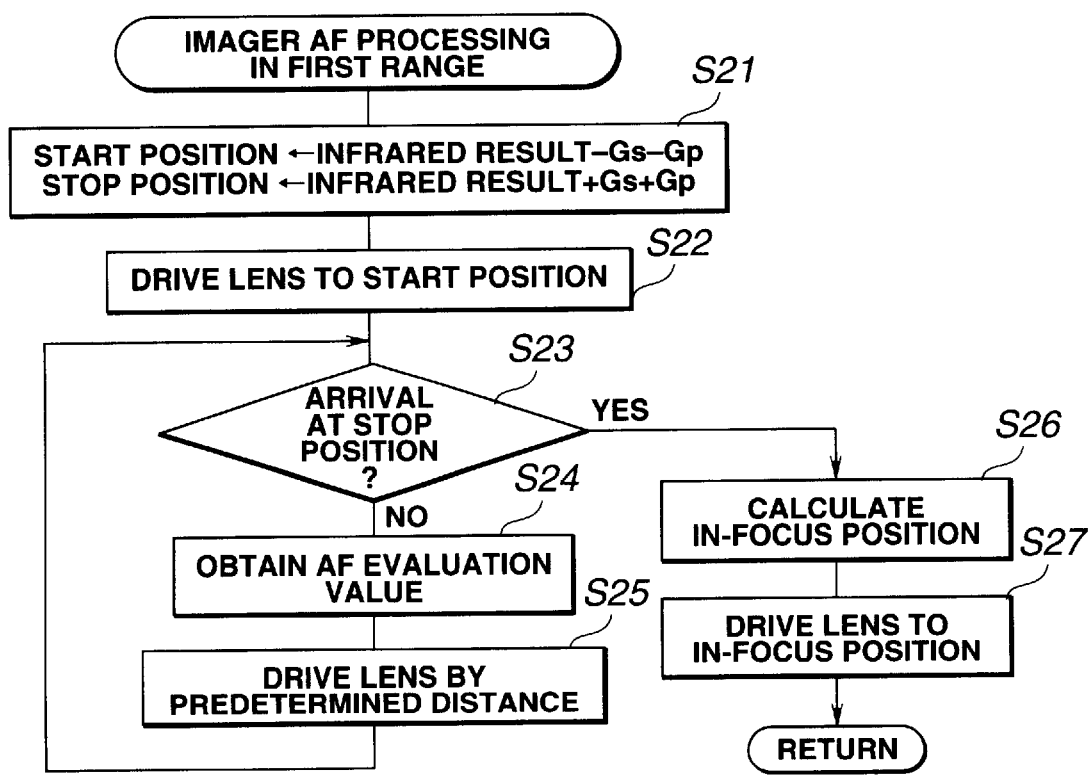
FIG. 5 is a flow chart showing a sequence of imager AF processing in a first range, of the sequences of the imaging processing to be conducted in the electronic image pickup apparatus shown in FIG. 1.

Referring to FIGS. 3, 4 and 5, a detailed description will be made hereinbelow of the imager AF processing (see the steps S5 and S6 in FIG. 2) to be conducted in electronic image pickup apparatus 1.

As mentioned above, in this electronic image pickup apparatus 1, the AE processing and the AF processing are implemented in response to an instruction signal from the 1st. release SW. In the AF processing, the rough adjustment is first made through the infrared active AF processing (see step S3 in FIG. 2) and the imager AF processing is then conducted in a range corresponding to a subject distance on the basis of a focal position detection result. The imager AF processing is implemented on the basis of the focal position detection result calculated through the aforesaid infrared active AF processing. The processing is performed in a predetermined range in which this focal position detection result assumes its central value. Therefore, there is a need to preset a predetermined range for the implementation of the imager AF processing for the fine adjustment.

Meanwhile, in a common electronic image pickup apparatus, prior to the imaging operation, the focusing operation is conducted with respect to a desired subject. This focusing operation is to condense a light beam from a desired subject through the imaging optical system. This forms an image on an image pickup surface of an image pickup device (CCD) in an in-focus condition. A focus lens group, forming a predetermined lens group constituting a portion of an imaging optical system, is shifted in a direction of its optical axis as a consequence of the focusing operation.

In this case, there is a tendency that the travel (traveling distance) of the focus lens group increases as a subject approaches the electronic image pickup apparatus. That is, the subject distance range, in which the focusing operation is conducted in a manner that the lens group moves by a predetermined travel (shifting quantity), tends to becomes narrower in the case of nearer photography. Therefore, it is preferable that the range of the detection by the imager AF processing for the fine adjustment of the focal position, is set in accordance with the subject distance to assume an appropriate range.

For this reason, in the electronic image pickup apparatus 1 according to this embodiment, as described briefly with reference to the flow chart of FIG. 2, the subject distance calculated through the infrared active AF processing is compared with a predetermined subject distance. If a decision is made to that the subject exists nearby, an image pickup means (focus lens group 3) is driven in a predetermined first range. If a decision is made that the subject distance calculated through the infrared active AF processing is equal to or longer than a predetermined distance, the image pickup means (focus lens group 3) is controlled to travel in a second range smaller than the first range. Incidentally, the first range and the second range signify traveling ranges of the focus lens group 3 preset according to subject distances.

A description will be given hereinbelow of an operation for the implementation of the imager AF processing in the second range.

In FIG. 3, in a step S11, the CPU 15 sets a start position and a stop position. These positions are used when the focus lens group 3 is driven to conduct the detecting operation of a focal position through the imager AF processing based on a calculation result by the infrared active AF processing (which will be referred to hereinafter as an infrared AF result). A set value of the start position is obtained by subtracting a variable Gs from a set value indicative of the position of the focus lens group 3 corresponding to a subject distance value based on the infrared AF result. Furthermore, a set value of the stop position is a value obtained by adding the variable Gs to the set value indicative of the position of the focus lens group 3 corresponding the subject distance value based on the infrared AF result. That is, the range of the implementation of the imager AF processing is a predetermined range (second range) centered on the subject distance value originating from the infrared AF result. This second range is set to be smaller or narrower than the first range which will be described later.

The variable Gs is a value determined in consideration of focal position detection errors and others estimated on the infrared active AF processing. This includes adjustment errors occurring in an adjustment process in the manufacture of the electronic image pickup apparatus 1, temperature errors resulting from distortion or the like occurring due to the environmental temperature variation in the imaging lens barrel 31, focal position detection errors stemming from mechanical errors of parts constituting the infrared active AF means 30, and calculation errors originating from the calculation of the travel of the focus lens group 3, corresponding to the subject distance that the CPU 15 effectuates in response to the output of the PSD. Furthermore, this variable Gs is a value peculiar to each electronic image pickup apparatus, and is stored in advance in the EEPROM 25 or the like and is read out by the CPU 15 at the implementation of the step S11.

In a step S12, the CPU 15 drives the focus motor 22 through the second motor driving circuit 19 to control the drive of the focus lens group 3 so that the focus lens group 3 takes the start position set in the aforesaid step S11. CPU 15 subsequently carries out the actual imager AF processing while moving the focus lens group 3 by a predetermined travel where the start position is taken as an origin (cardinal point).

In a step S13, the CPU 15 confirms whether or not the focus lens group 3 reaches the stop position set in the aforesaid step S11. If the focus lens group 3 has not reached the stop position, the CPU 15 controls the image pickup means and others to obtain a detection signal (image data) corresponding to the position of the focus lens group 3 at that time. This detection signal is outputted through the image pickup circuit 6 and the A/D conversion circuit 7 to the AF processing circuit 14 as mentioned above, and an AF evaluation value is calculated (obtained) as shown in a step S14. This AF evaluation value is sent to the CPU 15. Upon receipt of this AF evaluation value, the CPU 15 moves the focus lens group 3 by a predetermined travel in a step S15. Following this, the operational flow returns to the aforesaid step S13 to conduct the same processing repeatedly.

If the answer of the step S13 shows that the focus lens group 3 has arrived at the stop position, the operational flow goes to a step S16 where the CPU 15 calculates an in-focus position on the basis of the aforesaid AF evaluation value. On the basis of this calculation result, in a step S17, the CPU 15 controls the drive of the focus motor 22, through the second motor driving circuit 19, to drive the focus lens group 3 into the in-focus state. When the focus lens group 3 moves to the in-focus position and stops at this position, the sequence comes to an end (return). Thereafter, the operational flow goes to the step S7 in FIG. 2.

This series of operation will be described hereinbelow with reference to FIG. 4.

For example, in a state where the focus lens group 3 is at a position indicated at a reference mark A in FIG. 4, the focus lens group 3 is first shifted from the position A to the start position B set in the aforesaid step S11. The imager AF processing is conducted until the focus lens group 3 moves from the start position B and reaches the stop position C (steps S12 to S15). Additionally, the CPU 15 performs the calculation for the in-focus position on the basis of the AF evaluation value thus obtained (step S16). Thus, the position indicated by a reference mark D in FIG. 4, namely, the position of the focus lens group 3 corresponding to a peak value of the high-frequency component quantity, is detected as the in-focus position. Accordingly, the CPU 15 performs the drive control so that the focus lens group 3 reaches this in-focus position (step S17).

FIG. 5 shows a subroutine of an imaging processing sequence of electronic image pickup apparatus 1, and is a flow chart showing an imager AF processing sequence in the first range.

The imager AF processing in the first range signifies the processing to be conducted for when, as mentioned above, the subject distance obtained through the infrared active AF processing is shorter than the predetermined distance, as in the case of near photography.

In this case, in FIG. 5, in a step S21, the CPU 15 sets a start position and a stop position, used when the focus lens group 3 is driven for performing the detecting operation of a focal position by the imager AF processing based on the aforesaid infrared AF result. A set value of the start position is obtained by subtracting a variable Gs from a set value indicative of a position of the focus lens group 3 corresponding to a subject distance value forming an infrared result and further subtracting a variable Gp therefrom. A set value of the stop position is a value obtained by adding the variable Gs to a set value of the infrared AF result and further adding the variable Gp thereto. That is, the range of the implementation of the imager AF processing is the first range centered on a subject distance value obtained from the infrared AF result. Furthermore, this first range is larger than the aforesaid second range.

In addition, the variable Gp is a value predetermined in consideration of errors or the like occurring due to the parallax or the like. Still additionally, as well as the aforesaid variable Gs, this variable Gp is a value peculiar to each electronic image pickup apparatus, is stored previously in the EEPROM 25 or the like, and is read out by the CPU 15 in the implementation of the processing of step S21.

In a step S22, the CPU 15 controls the drive of the focus motor 22 through the second motor driving circuit 19 to drive the focus lens group 3 to the start position set in the aforesaid step S21. The CPU 15 subsequently conducts the actual imager AF processing while moving the focus lens group 3 by a predetermined travel from this start position.

That is, the same processing as in the aforesaid steps S13 to S16 in FIG. 2 is implemented in steps S23 to S26. Thereafter in-focus position of the focus lens group 3 is detected in the step S26 and the focus lens group 3 is shifted to that in-focus position in a step S27. When the focus lens group 3 stops at this position, the sequence comes to an end (return). Thereafter, the operational flow proceeds to the aforesaid step S7 in FIG. 2.

Incidentally, the sequence in the step S23 and steps S24 to S27 correspond to the processing in the steps S13 to S17 in FIG. 2. Accordingly, the description thereof will be omitted for brevity.

As described above, according to this embodiment, both an infrared active AF means and an imager AF means are provided. In the AF processing to be conducted prior to the imaging operation, the infrared active AF processing is first carried out to roughly calculate the subject distance to a desired subject. The imager AF processing is done on the basis of the infrared active AF processing to perform the fine adjustment of the focusing operation. In this case, the detection range (scanning range) to be taken in the implementation of the imager AF processing is set as a first range or a second range smaller than the first range in accordance with a subject distance (infrared AF result) calculated through the infrared active AF processing. In the case in which the subject distance is short, the detection range switching control is implemented for detection in a wider range by the imager AF processing. Accordingly, it is possible to secure a high-accuracy focusing operation at all times without being influenced by of the errors caused by parallax or the like occurring in the near photography.

In addition, in the case of the imager AF processing in the first range, although the detection range is set on the basis of the calculation result of the infrared active AF processing (that is, using the infrared AF result as a center value and in consideration of the predetermined variables Gs and Gp) the invention is not limited to this. For example, if the start position is set at the infinite position and the stop position is set at the nearest position, it is also appropriate that the focal position detecting operation is conducted through the imager AF processing over the whole range in which the focus lens group 3 is movable. In this case, although the imager AF processing takes time, since the detection is carried out over the whole range, a higher-accuracy focusing operation becomes possible, thereby providing a better imaging result.

The start position and stop position of the focus lens group 3 in the imager AF processing are set to both end points (point B and point C in FIG. 4) of the detection range (first range or second range) in accordance with the subject distance calculated in the infrared active AF processing (step S11 in FIG. 3).

In this invention, the start position of the detection range by the imager AF processing is not limited to this, and the following operation is also acceptable.

Figure 6:
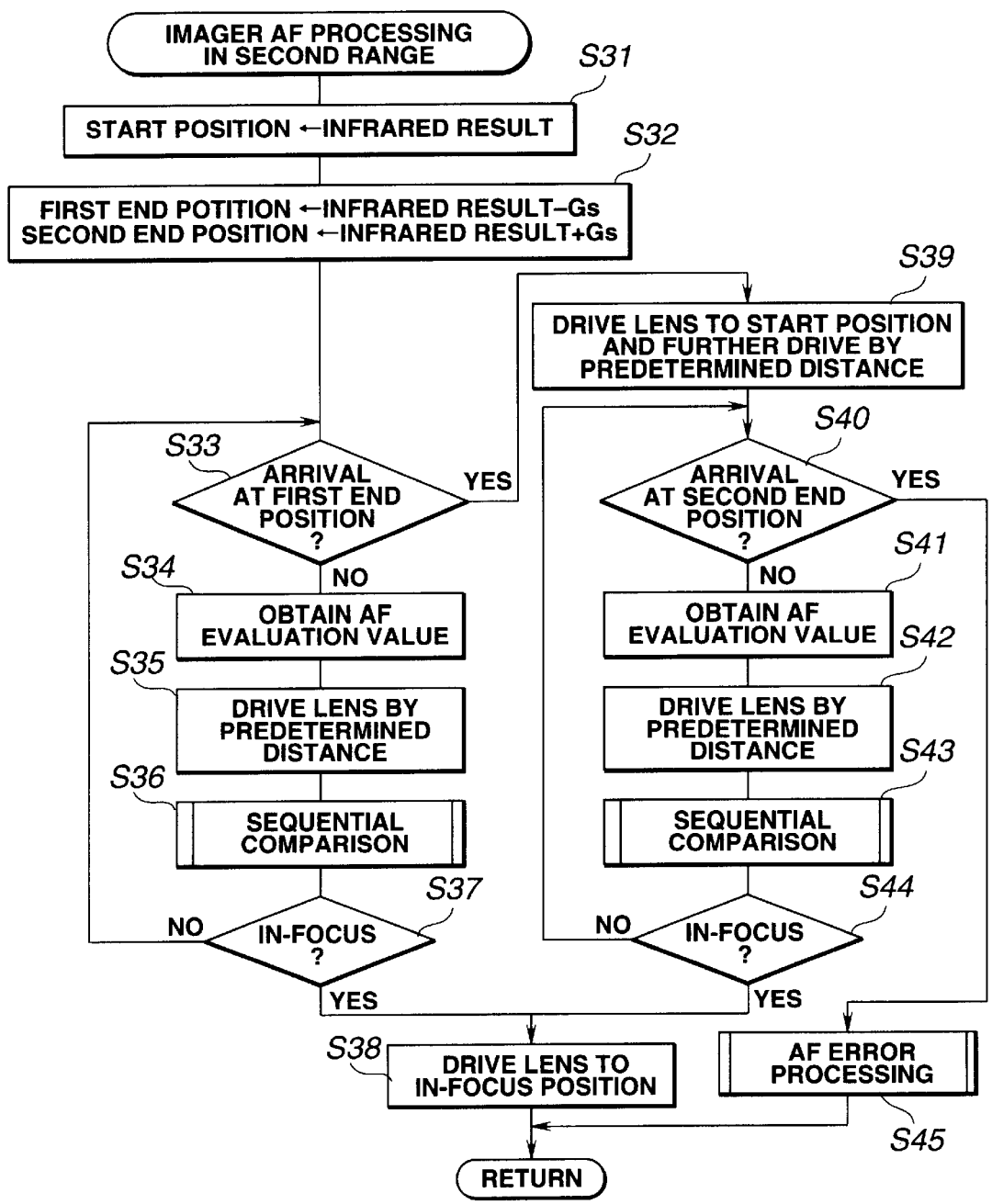
FIG. 6 shows a subroutine of a sequence of imaging processing to be conducted in an electronic image pickup apparatus equipped with an autofocusing system according to another embodiment of this invention, and is a flow chart showing a sequence of imager AF processing in a second range.
Figure 7:
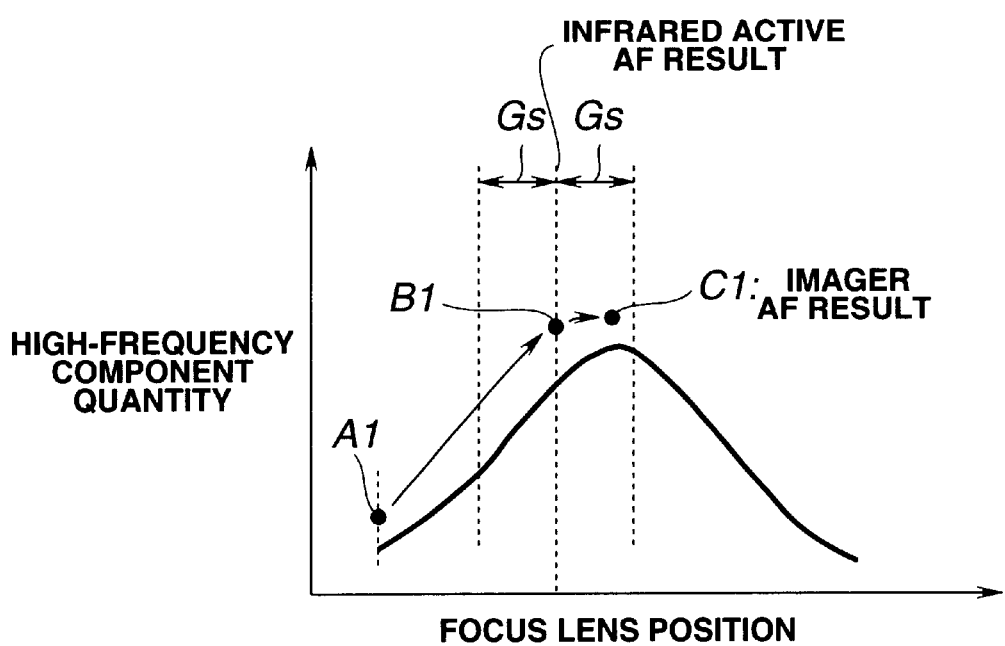
FIG. 7 is an illustration of the relationship between a high-frequency component quantity at the implementation of the imager AF processing in the second range in the electronic image pickup apparatus according to the embodiment of FIG. 6, and a position of a focus lens.
Figure 8:
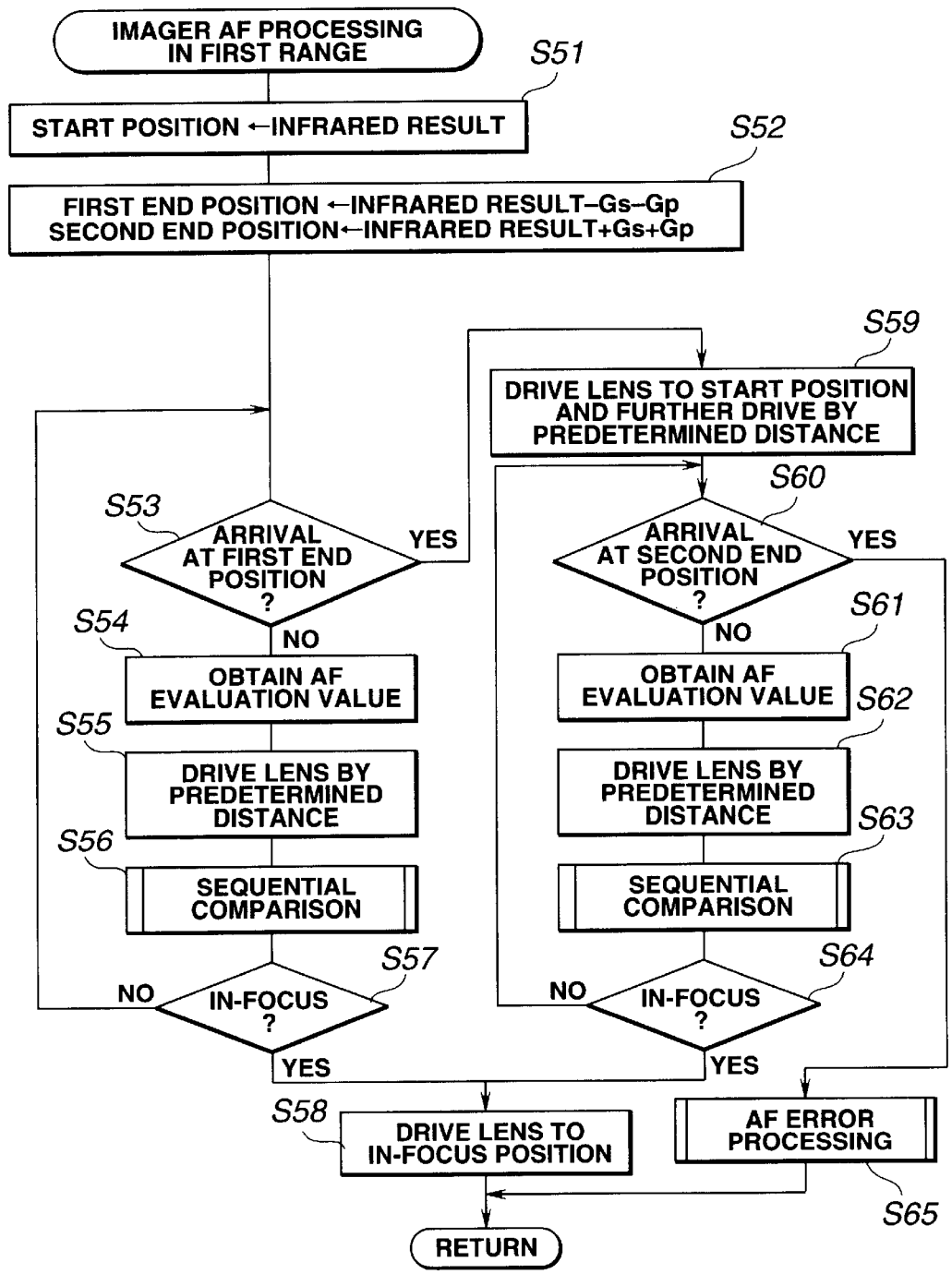
FIG. 8 shows a subroutine of a sequence of imaging processing to be conducted in the electronic image pickup apparatus according to the embodiment of FIG. 6, and is a flow chart showing a sequence of the imager AF processing in a first range.

FIGS. 6, 7 and 8 are detailed illustrations of imager AF processing (see step S5 and step S6 in FIG. 2) to be conducted in imaging processing by an electronic image pickup apparatus according to a second embodiment of this invention.

The basic configuration of the electronic image pickup apparatus according to the second embodiment is the same as that in the above-described embodiment, but some differences exist in the control to be implemented in the imager AF processing. Therefore, the detailed construction and the main operation to be conducted in imaging processing are omitted from illustration, and FIGS. 1 and 2 will be referred to instead.

First of all, a description will be given hereinbelow of imager AF processing in a second range to be conducted in imaging processing (see FIG. 2) in the electronic image pickup apparatus according to this embodiment.

In FIG. 6, in a step S31, the CPU 15 drives the focus motor 22 through the second motor driving circuit 19 to control the drive of the focus lens group 3 so that the focus lens group 3 moves to a focus lens position (position indicated at reference mark B1 in FIG. 7) corresponding to a subject distance (infrared AF result) calculated through infrared active AF processing. In this embodiment, this focus lens position B1 is set as the start position.

Subsequently, in a step S32, the CPU 15 sets both end positions of a predetermined range in which the focus lens group 3 is to be driven in implementing the imager AF processing, namely, a detection range (in this case, a second range), on the basis of the infrared AF result. A value of one end position (first end position) of the second range to be set here is a value obtained by subtracting a variable Gs from a set value representing a position of the focus lens group 3 corresponding to a subject distance value based on the infrared AF result. Furthermore, a set value of the other end position (second end position) is a value obtained by adding the variable Gs to the set value representing the position of the focus lens group 3 corresponding to the subject distance value based on the infrared AF result. That is, the first end position corresponds to the start position in the second range in the above-described embodiment, while the second end position is equivalent to the stop position in the second range in the above-described embodiment (see FIG. 3). Incidentally, as explained in the above-described embodiment, the variable Gs is a value determined in consideration of the focal position detection errors or the like estimated in the infrared active AF processing, and is stored previously in the EEPROM 25 or the like and read out by the CPU 15 in the implementation of the processing in the step S32.

After the first end position and the second end position are set in this way, the CPU 15 first conducts a focal position detecting operation while moving the focus lens group 3 by a predetermined travel toward the first end position where the start position set in the aforesaid step S31 is taken as an origin.

That is, in a step S33, the CPU 15 confirms whether or not the focus lens group 3 reached the first end position set in the aforesaid step S32. If the focus lens group 3 does not reach the first end position, the operational flow goes to the next step S34 where the CPU 15 controls the image pickup means and others to obtain a detection signal (image data) corresponding to a position of the focus lens group 3 at that time. The AF processing circuit 14 receives this detection signal to calculate an AF evaluation value and outputs the calculation result to the CPU 15. Subsequently, in a step S35, the CPU 15 moves the focus lens group 3 by a predetermined travel to obtain the next AF evaluation value.

In a step S36, the CPU 15 makes a comparison between a previous AF evaluation value and the AF evaluation value obtained in the step S34 (sequential comparison processing). In step S37, the CPU 15 decides whether or not the present evaluation value obtained in the step S34 is the maximum value an in-focus condition. If this decision shows that the AF evaluation value obtained in the step S34 is the maximum value (in-focus condition), the operational flow advances to a step S38. At step S38 the CPU 15 moves the focus lens group 3 to the detected in-focus position (position indicated at reference mark C1 in FIG. 7), terminates this sequence and returns to the imaging processing sequence (see FIG. 2) (return).

On the other hand, if the decision of the aforesaid step S37 shows that the AF evaluation value obtained in the step S34 does not assume the maximum value (no in-focus state), the operational flow returns to the step S33 to conduct the subsequent processing repeatedly.

Meanwhile, if the confirmation result in the aforesaid step S33 indicates that the focus lens group 3 has reached the first end position, it is assumed that the position at which the high-frequency component quantity assumes the maximum value does not exist between the start position (the position B1 in FIG. 7, forming the infrared AF result) and the first end position. Accordingly, in this case, the operational flow advances to a step S39 where the CPU 15 moves the focus lens group 3 to the start position (position B1) and further shifts focus lens group 3 by a predetermined travel from the start position toward the second end position side. Thereafter, in the following processing, the focal position detecting operation is conducted moving toward the second end position.

In a step S40, the CPU 15 confirms whether or not the focus lens group 3 reaches the second end position set in the aforesaid step S32. If the focus lens group 3 is not at the second end position, the operational flow goes to the next step S41 where the CPU 15 controls the image pickup means and others to obtain a detection signal (image data) corresponding to a position of the focus lens group 3 at that time. The AF processing circuit 14 receives this detection signal and calculates an AF evaluation value. The calculated AF evaluation value being outputted to the CPU 15. Subsequently, in a step S42, the CPU 15 moves the focus lens group 3 by a predetermined travel to obtain the next AF evaluation value.

In the next step S43, the CPU 15 conducts the sequential comparison processing as in the aforesaid step S36. In step S44, as in the aforesaid step S37, the CPU 15 decides whether or not the AF evaluation value obtained in the step S41 assumes the maximum value an in-focus condition. If the decision shows no in-focus condition, the operational flow returns to the aforesaid step S40 to repeatedly conduct the processing from this step.

If the decision of the aforesaid step S44 shows that the AF evaluation value obtained in the step S41 is at the maximum value (in-focus state), the operational flow goes to the step S38 where the CPU 15 moves the focus lens group 3 to the detected in-focus position (position indicated at reference mark C1 in FIG. 7). Following this, the sequence comes to an end, and the operational flow returns to the imaging processing sequence (see FIG. 2) (return).

If the confirmation of the arrival of the focus lens group 3 at the second end position is made in the step S40, it is assumed that the position at which the high-frequency component quantity assumes the maximum value does not exist between the start position (position B1 forming the infrared AF result) and the second end position. That is, the result of the imager AF processing in the second range indicates no detection of a focal position. Accordingly, in this case, AF error processing is performed in step S45. For example, the fact that the focal position detection cannot be performed is indicated as a warning to the user through the use of a display means (not shown). Thereafter the sequence comes to an end (return).

A description will now be made of the imager AF processing in the first range to be conducted in the imaging processing (see FIG. 2) of the electronic image pickup apparatus according to this embodiment. This imager AF processing sequence in the first range nearly has the same flow as that of the imager AF processing sequence in the second range described above with reference to FIG. 6. The difference of this imager AF processing sequence is only that, as shown in a step S52, the first end position is set as a value obtained by subtracting a variable Gs from a set value representing a position of the focus lens group 3 corresponding to a subject distance value based on the infrared AF result and further subtracting a variable Gp therefrom. A set value of the second end position is a value obtained by adding the variable Gs to the set value of the infrared AF result and further adding the variable Gp thereto. That is, the range of the implementation of the imager AF processing of the first range, is set to be wider than that of the second range.

In FIG. 8, in a step S51, the CPU 15 sets the start position on the basis of an infrared AF result and then moves the focus lens group 3 to that position. Subsequently, in a step S52, the CPU 15 sets both end positions of a predetermined range (in this case the first range) in which the focus lens group 3 is to be driven. A set value of one end position (first end position) of the first range is obtained by subtracting the variable Gs from a set value indicative of a position of the focus lens group 3 corresponding to a subject distance based on an infrared AF result and further subtracting the variable Gp therefrom. A set value of the other end position (second end position) is obtained by adding the variable Gs to the set value indicative of the position of the focus lens group 3 corresponding to the subject distance value based on the infrared AF result and further adding the variable Gp thereto.

After the first end position and the second end position are set in this way, the CPU 15 performs a focal position detecting operation while moving the focus lens group 3 by a predetermined travel toward the first end position side in a state where the start position is set as an origin.

That is, in a step S53, the CPU 15 confirms whether or not the focus lens group 3 reached the first end position. If the focus lens group 3 did not reach the first end position, the operational flow advances to the next step S54 where the CPU 15 controls the image picking means and others. An AF evaluation value, corresponding to a position of the focus lens group 3 at that time, is calculated (obtained) and outputted to the CPU 15. Then, in a step S55, the CPU 15 moves the focus lens group 3 by a predetermined travel.

In a step S56, the CPU 15 makes a comparison of the AF evaluation value obtained in the aforesaid step S54 (sequential comparison processing). In the next step S57, the CPU 15 decides whether or not the obtained AF evaluation value is the maximum value, an in-focus condition. If the decision shows that the AF evaluation value assumes the maximum value (in-focus condition), the operational flow goes to a step S58 where the CPU 15 moves the focus lens group 3 to the detected in-focus position. Thereafter, this sequence comes to an end, and the operational flow returns to the imaging processing sequence (see FIG. 2) (return).

If the decision of the aforesaid step S57 shows that the AF evaluation value obtained this time is not the maximum value (out-of-focus state), the operational flow goes to the aforesaid step S53 to repeat the subsequent processing from this step.

On the other hand, if the confirmation of the arrival of the focus lens group 3 at the first end position is made in the aforesaid step S53, it is assumed that the position (in-focus position) at which the high-frequency component quantity assumes the maximum value does not exist between the start position and the first end position. Accordingly, in this case, the operational flow goes to a step S59 where the CPU 15 moves the focus lens group 3 to the start position and the moves the focus lens group 3 by a predetermined travel from the start position toward the second end position. Thereafter, in the following processing, the focal position detecting operation is conducted while moving toward the second end position.

That is, in a step S60, the CPU 15 confirms whether or not the focus lens group 3 reached the second end position. If the focus lens group 3 is not at the second end position, the operational flow goes to a step S61 where an AF evaluation value at that time is calculated (obtained) and outputted to the CPU 15. After this, in a step S62, the CPU 15 moves the focus lens group 3 by a predetermined travel.

Following this, in a step S63, the CPU 15 performs the sequential comparison processing. In step S64, the CPU 15 decides whether or not a present AF evaluation value is the maximum value an in-focus condition. If the decision shows that the AF evaluation value does not the maximum value (in-focus state), the operational flow returns to the aforesaid state S60 to repeat the subsequent processing from this step. If the decision in the aforesaid step S64 indicates an in-focus condition, the operational flow goes to the step S58 to move the focus lens group 3 to the detected in-focus position. Thereafter, this sequence comes to an end, and the operational flow returns to the imaging processing sequence (see FIG. 2) (return).

If the confirmation of the arrival of the focus lens group 3 at the second end position is made in the aforesaid step S60, it is assumed that the position (in-focus position) at which the high-frequency component quantity assumes the maximum value does not exist between the start position and the second end position. That is, the result of the imager AF processing in the first range indicates no focal position detection. Accordingly, in this case, as in the aforesaid S45 in FIG. 6, AF error processing is conducted in a step S65, and subsequently the sequence comes to an end (return).

This embodiment, in which the control is performed in this way, can offer the same effects as those of the above-described embodiment. Since for the imager AF processing, the start position is set at a position corresponding to the detection result (infrared AF result) by the infrared active AF processing and the focal position detecting operation uses this position as an origin, instead of detecting the whole predetermined range as in the above-described embodiment, it is possible to speed up the operation.

Incidentally, in the embodiment shown in FIGS. 6 to 8, when the result of the focal position detecting operation in a predetermined range (first range or second range) by the imager AF means shows no detection of a focal position, the AF error processing is implemented (step S45 in FIG. 6 and step S65 in FIG. 8). This is performed for the principal object of this invention, that is, for the purpose of securing a high-accuracy focusing operation. However, depending upon circumferences, it is considered that an imaging operation comes before the high-accuracy focusing operation.

Accordingly, in the electronic image pickup apparatus 1 according to this embodiment, the infrared active AF processing is conducted first to roughly implement the focal position detecting operation. To meet the above-mentioned requirement, the following control can also be implemented.

That is, instead of the AF error processing in the step S45 in FIG. 6 and the step S65 in FIG. 8, the following processing is also feasible. Namely, in the step S40 in FIG. 6 or the step S60 in FIG. 8, if the confirmation is made that the focus lens group 3 reaches the second end position, the operational flow goes to the step S40 or the step S65 and the result of the infrared active AF processing is employed. Following this, in the step S38 in FIG. 6 or the step S58 in FIG. 8, the focus lens group 3 is moved to a position corresponding to the infrared AF result.

With such control, when a focal position is detected through the imager AF processing in a predetermined range, it is possible to secure a higher-accuracy focusing operation. On the other hand, even if no detection of the focal position is made through the imager AF processing, the employment of the focal position detection result of the infrared active AF means ensures the detection of the focal position. Therefore, an imaging operation of a desired subject can be conducted.

It is obvious that this invention covers different embodiments in a wide scope without constituting departures from the spirit and scope of the invention. This invention is not restricted by the specific embodiments except as defined by the appended claims.

What is claimed is:

1. An autofocusing system for focusing an image of a subject in an electronic image pickup apparatus, said autofocusing system comprising:

an imaging optical system which receives said image of said subject, said imaging optical system including a focus lens group;

an image pickup device which performs a photoelectric conversion of said image of said subject to produce an electronic image signal;

a driving circuit which controls said focus lens group to move through one of a first range and a second range of positions, said first range being larger than said second range;

an auto-focus processing circuit which detects a high-frequency component of said electronic image signal and detects additional high-frequency components of additional electronic image signals produced due to movement of said focus lens group caused by said driving circuit;

said driving circuit controls said focus lens group based on an output of said auto-focus processing circuit;

a light source which radiates infrared light toward said subject;

a light receiver which receives reflected light produced by reflection of said infrared light on said subject, said light receiver producing an output signal corresponding to a distance between said electronic image pickup apparatus and said subject;

a controller which controls said driving circuit to move said focus lens group through said first range of positions when said distance to said subject is shorter than a predetermined distance and controls said driving circuit to move said focus lens group through said second range of positions when said distance to said subject is greater than said predetermined distance.

2. An autofocusing system according to claim 1, wherein said controller controls said driving circuit to move said focus lens group through one of said first and second ranges where an end portion of one of said first and second ranges is taken as a start point of said movement.

3. An autofocusing system according to claim 1, wherein said controller controls said driving circuit to move said focus lens group to scan one of said first and second ranges entirely and thereafter, said controller detects an in-focus position of said focus lens group.

4. An autofocusing system according to claim 1, wherein said controller controls said driving circuit to move said focus lens group to a starting position corresponding to said distance determined by said light receiver.

* * * * *